(12) United States Patent
Wang

(10) Patent No.: US 6,593,392 B2
(45) Date of Patent: Jul. 15, 2003

(54) CURABLE HALOGENATED COMPOSITIONS

(75) Inventor: Zhikai Wang, Roswell, GA (US)

(73) Assignee: Corning Incorporated, Corning, NY (US)

( * ) Notice: Subject to any disclaimer, the term of this patent is extended or adjusted under 35 U.S.C. 154(b) by 39 days.

(21) Appl. No.: 09/886,784

(22) Filed: Jun. 22, 2001

(65) Prior Publication Data

US 2003/0050358 A1 Mar. 13, 2003

(51) Int. Cl.$^7$ .................................................. C08F 2/46
(52) U.S. Cl. ............................ 522/83; 522/70; 522/71; 522/74; 522/77; 522/81; 522/84; 522/148; 522/172; 522/155; 522/156; 522/184; 522/185; 385/129; 385/147; 428/391; 428/394; 430/270.1
(58) Field of Search ............................. 522/70, 71, 74, 522/77, 81, 83, 84, 148, 172, 155, 156, 184, 185; 385/129, 147; 430/270.1; 428/391, 394

(56) References Cited

U.S. PATENT DOCUMENTS 5,858,526 A * 1/1999 Floch et al.
5,910,522 A * 6/1999 Schmidt et al.
6,136,939 A * 10/2000 Mager et al.
6,246,505 B1 * 6/2001 Teowee et al.
6,303,730 B1 * 10/2001 Fries et al.
6,423,128 B1 * 7/2002 Amberg-Schwab et al.
6,451,432 B1 * 9/2002 Azzopardi et al.

OTHER PUBLICATIONS

Roscher, Christof et al., "New Inorganic–Organic Hybrid Polymers for Integrated Optics", 1998, Mat. Res. Soc. Symp. Proc:, vol. 519, pp. 239–244.

* cited by examiner

*Primary Examiner*—James J. Seidleck
*Assistant Examiner*—Sanza L McClendon
(74) *Attorney, Agent, or Firm*—James V. Suggs

(57) ABSTRACT

The invention provides an organic/inorganic hybrid material with low optical loss at telecommunications wavelengths. Energy curable compositions of the present invention include condensed silica nanoparticles, a fluorinated silane coupling agent, an energy curable silane coupling agent, and a halogenated monomer or oligomer. Polymeric materials of the present invention include condensed silica nanoparticles having a mixture of organosilane coupling agents covalently bound to the exterior surface of the nanoparticles and a halogenated solid polymer matrix, wherein the mixture of organosilane coupling agents includes an at least partially fluorinated coupling agent, and a coupling agent covalently bound to the polymer matrix. The materials of the present invention are useful in making low-loss optical devices for telecommunications applications.

27 Claims, 3 Drawing Sheets

Energy Curable Formulation

↓ Cure

↓ Bake

Hybrid Material

R = 1*H*,1*H*,2*H*,2*H*-heptadecafluorodecyl
Rf = 1*H*,1*H*,2*H*,2*H*-tridecafluorooctyl
Rl = 2,2,3,3,4,4,5,5-octafluorohexane-1,6-diyl

CURABLE HALOGENATED COMPOSITIONS

BACKGROUND OF THE INVENTION

1. Field of the Invention

The invention relates to curable organic-inorganic hybrid compositions having a low optical loss, methods of making and using such compositions, and polymeric materials and articles made from such compositions. The compositions of the present invention are useful in the field of fiber optic communications.

2. Description of the Related Art

Very highly fluorinated polymeric materials have a low optical loss in the infrared, due to their low concentration of carbon-hydrogen, nitrogen-hydrogen, and oxygen-hydrogen bonds, all of which have a vibrational overtone absorption band around 1550 nm in wavelength. The common advantages of these materials are low optical loss, such as around 0.1–0.4 dB/cm at 1550 nm, and good thermal stability. While the highly fluorinated compositions can have a lower optical loss than the corresponding hydrogenated materials, they may also have a very low surface tension, poor compatibility with other materials, poor processability, poor wetting, and high shrinkage upon curing. Additionally, high fluorination also causes a significant depression in the refractive index of polymeric materials to a level down to below n=1.42 at 1550 nm.

Many efforts have been made to develop low optical loss organic-inorganic hybrid materials through the use of the sol-gel process. Although these hybrid materials are theoretically advantageous because of the optical clarity and hardness of the inorganic portion, the sol-gel process can result in materials with a high hydroxyl content. The hydroxide functional group has a strong vibrational overtone at around 1550 nm. Thus, in order to be useful in optical communications, sol-gel derived materials must be substantially dehydroxylated. However, the process of conventional dehydroxylation, requires a high temperature treatment and can damage the organic portion of the material, and can create cracking problems in films thicker than five microns and in monolithic materials. This cracking is due to high capillary pressure and the stress induced by shrinkage from the removal of water and alcohol through condensation reactions and evaporation. Further, the shrinkage of these materials makes them unsuitable for use in polymer microreplication processes. Another method for the incorporation of inorganics into processable polymer materials is the dispersion of silica or titantia particles prepared by the sol-gel process in fluorinated polyimide (ULTRADEL® 9020D) or polytetrafluoroethylene-derived (TEFLON®) organic polymers. One disadvantage of this method is the aggregation and/or agglomeration of particles due to the hydrophilicity of the surfaces of the particles.

SUMMARY OF THE INVENTION

One aspect of the present invention relates to an energy curable composition including condensed silica nanoparticles; an at least partially halogenated organosilane coupling agent; a halogenated energy curable monomer or oligomer; and an organosilane coupling agent containing an energy curable organic moiety.

Another aspect of the present invention relates to an energy curable composition including condensed silica nanoparticles; at least one coupling agent of the formula $Rf_xR_ySiQ_{4-x-y}$ wherein Rf is an at least partially fluorinated organic moiety bound to the silicon atom by a carbon atom, R is an organic moiety bound to the silicon atom by a carbon atom, Q is a hydrolyzable ligand selected from the group consisting of chlorine, bromine, iodine, a $C_1$ to about $C_{10}$ alkoxy, and a $C_1$ to about $C_{10}$ acyloxy, x is 1, 2, or 3, y is 0, 1, or 2, and the sum of x and y is no greater than 3; at least one coupling agent of the formula $Rd_xR_ySiQ_{4-x-y}$ wherein Rd is an organic moiety having an energy curable functional group bound to the silicon atom by a carbon atom, R is an organic moiety bound to the silicon atom by a carbon atom, Q is a hydrolyzable ligand selected from the group consisting of chlorine, bromine, iodine, a $C_1$ to about $C_{10}$ alkoxy, and a $C_1$ to about $C_{10}$ acyloxy, x is 1, 2, or 3, y is 0, 1, or 2, and the sum of x and y is no greater than 3; and at least one halogenated energy curable monomer or oligomer.

Another aspect of the present invention relates to a polymeric material including condensed silica nanoparticles having a mixture of organosilane coupling agents covalently bound to the exterior surface of the nanoparticles and a halogenated solid polymer matrix, wherein the mixture of organosilane coupling agents includes an at least partially fluorinated coupling agent and a coupling agent covalently bound to the polymer matrix, and the condensed silica nanoparticles are homogeneously dispersed in the solid polymer matrix.

Another aspect of the present invention relates to a planar optical device having a waveguide core and a waveguide cladding, wherein at least one of the waveguide core and waveguide cladding are made from the polymeric material of the present invention.

Another aspect of the present invention relates to a thin film optical device having alternating layers of transparent materials with differing refractive indices, wherein at least one of the materials is the polymeric material of the present invention.

Another aspect of the present invention relates to a monolithic optical element including the polymeric material of the present invention Another aspect of the present invention relates to a process for making an energy curable composition by reacting condensed silica nanoparticles with a mixture of an at least partially fluorinated organosilane coupling agent and an organosilane coupling agent containing an energy curable organic moiety to yield nanoparticles with the mixture of the coupling agents covalently bound to the surface of the nanoparticles; and dispersing the nanoparticles so formed in at least one halogenated energy curable monomer or oligomer.

Another aspect of the present invention relates to a process for making a polymeric material by reacting condensed silica nanoparticles with a mixture of an at least partially fluorinated organosilane coupling agent and an organosilane coupling agent containing an energy curable organic moiety to yield nanoparticles with the mixture of the coupling agents covalently bound to the surface of the nanoparticles; dispersing the nanoparticles so formed in at least one halogenated energy curable monomer or oligomer; and curing the composition so formed with a source of energy.

Another aspect of the present invention is a process for making an article of manufacture comprising the steps of reacting condensed silica nanoparticles with an at least partially fluorinated organosilane coupling agent and an organosilane coupling agent containing an energy curable organic moiety to yield nanoparticles with the coupling agent or agents bound to the surface of the nanoparticles;

dispersing the mixture so formed in at least one halogenated energy curable monomer or oligomer; contacting the composition so formed with a mold surface; curing the composition in contact with the mold with a source of energy; and removing the article so formed from the mold surface.

The materials of the present invention have a low optical loss in the infrared, less than 1.0 dB/cm at 1550 nm, making them suitable for use in devices for optical communication. Low shrinkage upon cure is observed, and low coefficient of thermal expansion, low thermo-optic coefficient and low birefringence of the polymeric material are expected due to the high inorganic content of these materials. The materials of the present invention may be formulated to have higher refractive indices than their wholly organic counterparts due to the higher refractive indices of the inorganic constituents. The energy curable composition has good wettability, and the polymeric material has good release characteristics from nickel microreplication tools as well as good adhesion to silaceous substrates such as glass, silica, and silicon, making the materials of this invention well suited for use in polymer microreplication processes.

Additional features and advantages of the invention will be set forth in the detailed description which follows, and in part will be readily apparent to those skilled in the art from the written description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed:

The accompanying drawings are included to provide a further understanding of the invention, and are incorporated in and constitute a part of this specification. The drawings illustrate one or more embodiment(s) of the invention, and together with the description serve to explain the principles and operation of the invention.

DETAILED DESCRIPTION OF THE INVENTION

Figure 1:
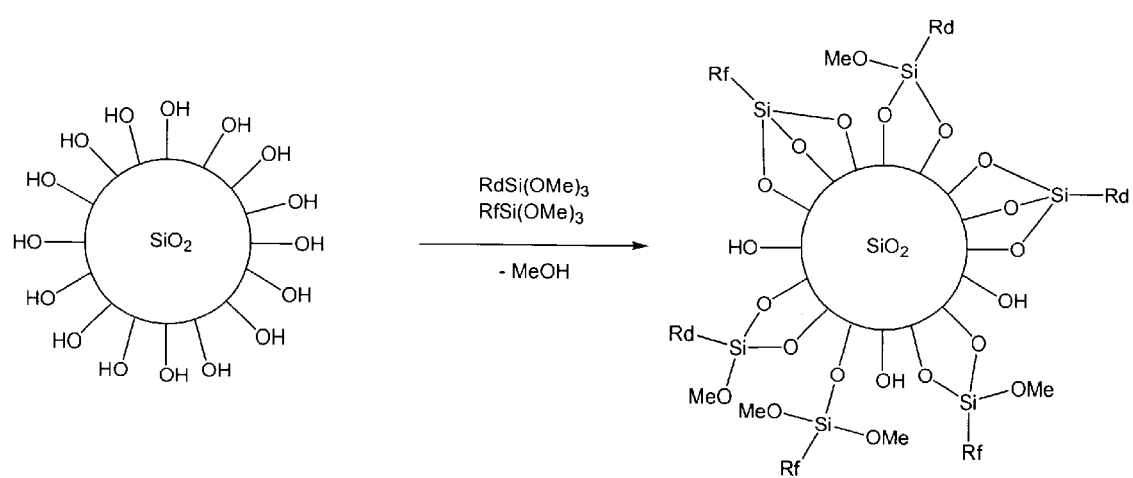
FIG. 1 is a diagram of the surface functionalization of silica nanoparticles by a mixture of organosilane coupling agents.

The generation of silica nanoparticles in situ in a hybrid material using the traditional sol-gel process involves the hydrolysis and condensation of silicon alkoxides. In this process, incomplete condensation and alcohol and water entrapment inside the nanoparticles are often observed. The hydroxyl groups of the entrapped species and of the uncondensed silanols of the nanoparticle absorb strongly around 1550 nm, interfering with optical communication. As a person of skill in the art will appreciate, the extreme heat necessary to fully condense the nanoparticles and remove water and/or alcohols is incompatible with the organic portion of the hybrid material. Further, shrinkage during condensation causes stress-induced cracking of the materials. The present invention obviates the use of the sol-gel process through the use of condensed silica nanoparticles. The condensed silica nanoparticles are fully condensed in their manufacturing process, and have substantially no silanol hydroxyls in their interiors. The use of condensed silica nanoparticles avoids the incomplete condensation and alcohol and water trapping problems frequently encountered in the use of the sol-gel process in organic systems.

Condensed silica nanoparticles are available as colloidal suspensions in organic solvents from suppliers such as Degussa and Nissan Chemical America. For example, MEK-ST, available from Nissan Chemical America, is a 30 wt % suspension of 12–14 nm silica nanoparticles in methyl ethyl ketone. These nanoparticles have an exterior surface layer of silanols. Another example available from Nissan Chemical America is MA-ST-S, a 30 wt % suspension of 8–11 nm silica nanoparticles in methanol. These nanoparticles have a mixed exterior surface layer with both silanol and methoxysilane functionalities. In order to provide a material with substantially no scattering loss, condensed silica nanoparticles suitable for use in the present invention should be smaller than the desired operating wavelength. Consequently, for use in optical communication devices, substantially all of the nanoparticles (95%+) should have an average diameter of no greater than 75 nm. Desired nanoparticles have average diameters of no greater than about 50 nm, and especially desirable nanoparticles have average diameters of no greater than about 5 nm. Silica nanoparticles as small as 1 nm have been reported in the research literature. As, and if, they become available commercially, smaller sized condensed silica nanoparticles will likewise be suitable for practicing the present invention.

The exterior surface of the condensed silica nanoparticle is modified with a mixture of organosilane coupling agents. One component of the mixture is an at least partially halogenated organosilane coupling agent. This coupling agent may have the formula $Rf_xR_ySiQ_{4-x-y}$ wherein Rf is an at least partially fluorinated organic moiety bound to the silicon atom by a carbon atom, R is an organic moiety bound to the silicon atom by a carbon atom, Q is a hydrolyzable ligand selected from the group consisting of chlorine, bromine, iodine, a $C_1$ to about $C_{10}$ alkoxy, and a $C_1$ to about $C_{10}$ acyloxy, x is 1, 2, or 3, y is 0, 1, or 2, and the sum of x and y is no greater than 3. The organic moiety R may include species such as, for example, a $C_1$ to about $C_{10}$ alkyl, a $C_1$ to about $C_{10}$ aryl, and may include functionalities such as, for example, halogen, ester, ether, amide, amine, ketone, thioether, or urethane. The at least partially fluorinated organic moiety Rf includes at least one carbon-fluorine bond, and may include other functional groups such as, for example, ester, ether, ketone, amine, amide, urethane, thioether, and sulfide. Suitable partially fluorinated organic moieties Rf may include perfluoroalkyl and perfluoroaryl groups. In order to minimize the optical loss of the polymeric material, the fluorinated coupling agent is desired to have a small number of C—H bonds in the Rf moiety. Especially desirable at least partially fluorinated organic moieties Rf have no greater than four carbon-hydrogen bonds. In some embodiments of the invention, the use of an Rf having a perfluorinated aryl moiety is preferred. The perfluorinated aryl moiety provides a material with a smooth refractive index gradient between the condensed silica nanoparticles and a low refractive index organic portion of the material, and therefore lowers scattering loss. In order to ensure compatibility of the fluorinated coupling agent with the rest of the energy curable composition, it is desirable to use acyclic perfluoroalkyl moieties of ten carbons or less, or cyclic perfluorinated moieties of twelve carbons or less. Fluorinated coupling agents for use in the present invention include, for example, [3-(pentafluorophenyl)propyl] triethoxysilane, (heptadecafluoro-1,1,2,2-tetrahydrodecyl) triethoxysilane, (2,2,2-trifluoroethyl)triethoxy-silane, (tridecafluoro-1,1,2,2-tetrahydrooctyl)triethoxysilane, and (tridecafluoro-1,1,2,2-tetrahydrooctyl) dimethylethoxysilane, and similar at least partially fluorinated coupling agents.

Another component of the mixture of organosilanes is an organosilane coupling agent containing an energy curable moiety. This coupling agent may have the formula $Rd_xR_ySiQ_{4-x-y}$ wherein Rd is an organic moiety including an energy curable functional group and is bound to the silicon atom by a carbon atom, R is an organic moiety bound to the silicon atom by a carbon atom, Q is a hydrolyzable ligand selected from the group consisting of chlorine, bromine, iodine, a $C_1$ to about $C_{10}$ alkoxy, and a $C_1$ to about $C_{10}$ acyloxy, x is 1, 2, or 3, y is 0, 1, or 2, and the sum of x and y is no greater than 3. The organic moiety R may include species such as, for example, a $C_1$ to about $C_{10}$ alkyl, a $C_1$ to about $C_{10}$ aryl, and may include functionalities such as, for example, halogen, ester, ether, amide, amine, ketone, thioether, or urethane. The energy curable functional group may be, for example, an ethylenically unsaturated group, an epoxide, or a thiol. Desirable energy curable functional groups may include, for example, acrylates, methacrylates, alkenes, maleimides, styrenes, vinyl ethers, epoxides and thiols. The organic moiety Rd may include other functionalities, such as, for example, alkylene, arylene, ester, ether, ketone, amine, amide, urethane, thioether, and thiol. The energy curable functional group of the coupling agent is chosen to be copolymerizable with the halogenated monomer or oligomer. Coupling agents containing energy curable moieties for use herein include, for example, (3-methacryloxypropyl)-trimethoxysilane, (3-methacryloxypropyl)dimethylmethoxysilane, (3-acryloxypropyl)-trimethoxysilane, vinyltrimethoxysilane, (3-glycidyloxypropyl) triethoxysilane, allyl-trimethoxysilane, and styrylethyltrimethoxysilane, and similar energy curable organosilane coupling agents The surface modification by the mixture of organosilane coupling agents changes the surface of the nanoparticles from hydrophilic to hydrophobic, thus allowing the inorganic nanoparticles to be compatible with organic media, such as, for example, a mixture of monomers or oligomers, or a polymer matrix. The organosilane coupling agents are attached to the silica-particle surface through Si—O—Si covalent bonds, which may be formed by reactions, such as hydrolysis and condensation reactions, as described below and known to one of ordinary skill in the art. In the coupling reactions, at least one hydrolyzable ligand Q of the coupling agent are replaced by surface silanols of the condensed silica nanoparticle, forming a Si—O—Si bond and forming a molecule of Q—H.

The organic portion of the energy curable composition includes one or more halogenated monomers or oligomers. Halogenated monomers and oligomers are defined for use herein as substances with an energy curable moiety and a substantially halogenated moiety. The halogens may be fluorine, chlorine, bromine, or a mixture thereof.

Examples of halogenated monomers for use herein include fluorinated acrylates, fluorinated methacrylates, fluorinated alkenes, fluorinated maleimides, fluorinated styrenes, fluorinated epoxides, fluorinated vinyl ethers, fluorinated allyl esters, chlorinated acrylates, chlorinated methacrylates, chlorinated styrenes, chlorinated epoxides, chlorinated vinyl ethers, chlorinated alkenes and chlorinated maleimides.

Specific monomers that may be used include, for example, 2,2,3,3,4,4-hexafluoropentane-1,5-diyl diacrylate; 2,2,3,3,4,4,5,5-octafluorohexane-1,6-diyl diacrylate; 2,2,3, 3,4,4,5,5-octafluoropent-1-yl acrylate; pentafluorobenzyl acrylate; pentachlorobenzyl methacrylate; pentafluorophenyl acrylate; pentachlorophenyl acrylate; 1,4,5,6,7,7-hexachlorobicyclo[2.2.1]hept-5-en-2-yl acrylate; 1,1,1,3,3, 3-hexafluoroprop-2-yl acrylate; 2,2,2-trifluoroethyl acrylate; 2,2,2-trifluoroethyl methacrylate; 2,2,3,3-tetrafluoropropyl acrylate; 1H,1H,2H,2H-heptadecafluorodecyl acrylate; 3,3, 4,4,5,5,6,6,7,7,8,8-tridecafluoro-1-octene; 3,3,4,4,5,5,6,6, 7,7,8,8,9,9,10,10,10-heptadecafluoro-1-decene, pentafluorophenylmaleimide; 2,3,5,6-tetrafluorobenzenebismaleimide; pentafluorostyrene; pentachlorostyrene; allyl perfluoroheptanoate; nonafluoro-n-butyl epoxide; 3-(perfluoro-n-decyl)-1,2-propeneoxide; 1,4-bis(2',3'-expoxypropyl)octafluoro-n-butane; vinyl perfluorooctanoate; and FAVE 3000 series and 4000 series fluorinated alkyl vinyl ethers available from Allied Signal; and similar halogenated monomers.

Examples of halogenated oligomers for use herein include perfluoropolyether polyacrylates and -methacrylates, halogenated polyester polyacrylates and -methacrylates, and halogenated polycarbonate polyacrylates and -methacrylates.

Specific oligomers that may be used include, for example, capped perfluoropolyethers of the formula

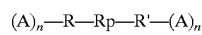

wherein Rp is a perfluorinated polyether moiety selected from the group consisting of —$CF_2O$—($CF_2CF_2O)_m$($CF_2O)_n$—$CF_2$—, —$CF(CF_3)O(CF_2)_4O[CF(CF_3)CF_2O]_qCF$ ($CF_3$)—, and —$CF_2O$—($CF_2CF_2O)_m$($CF_2O)_n$—$CF_2$—, wherein m and n designate the number of randomly distributed perfluoroethyleneoxy and perfluoromethyleneoxy backbone repeating subunits respectively, and q designates the number of —$CF(CF_3)CF_2O$— backbone repeating subunits; R and R' are divalent or trivalent connecting moieties selected individually from the group consisting of alkyl, aryl, ester, ether, amide, amine, and urethane groups, and A is a energy curable moiety selected from the group consisting of acrylate, methacrylate, maleimide, alkene, vinyl ether, epoxide, and thiol.

Halogenated polyester polyacrylates are described in commonly owned and copending U.S. patent application Ser. No. [SP00-177], which is incorporated herein by reference. Specific halogenated polyester polyacrylate oligomers include, for example,

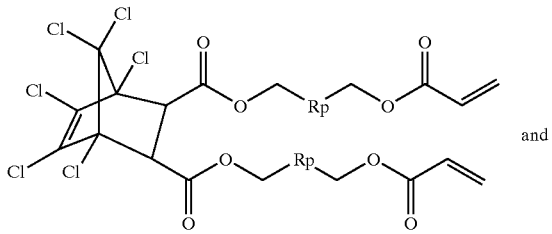

and

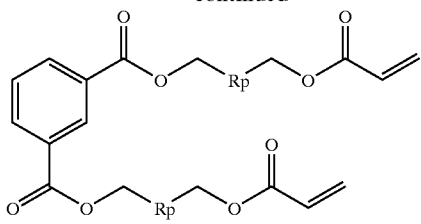

As will be appreciated by a person of skill in the art, halogenated monomers and oligomers may be used in combination with other halogenated or non-halogenated monomers and oligomers to lend the desired properties to the energy curable composition or to the polymer derived therefrom. In general, desirable monomers and oligomers are selected to have a low optical loss due to a low number of carbon-hydrogen, nitrogen-hydrogen, and oxygen-hydrogen bonds. Monomers and oligomers are chosen which will copolymerize with the energy curable moieties of the energy curable organosilane coupling agent.

The desired condensed silica nanoparticles, at least partially fluorinated organosilane coupling agents, energy curable organosilane coupling agents, and halogenated energy curable monomers and oligomers must be formulated into an energy curable composition in a manner such that the nanoparticles do not agglomerate and do become well-dispersed in the composition. In an exemplary embodiment of the invention, condensed silica nanoparticles are first reacted with a mixture of an at least partially fluorinated organosilane coupling agent and an energy curable organosilane coupling agent, thereby functionalizing the surfaces of the nanoparticles with the coupling agents and converting them from hydrophilic to organophilic, as shown in FIG. 1. For example, if the surface of the condensed silica nanoparticles are functionalized with a mixture of (3-methacryloxypropyl)trimethoxysilane and [3-(pentafluorophenyl)propyl]trimethoxysilane, a (3-methacryloxypropyl)silane species and a [3-(pentafluorophenyl)propylsilane species will be covalently bound to the surface of the nanoparticles. While the coupling agent is shown as a monolayer in FIG. 1, the skilled artisan will recognize that it may be deposited in a multilayer network, depending on reaction conditions. The hydrolysis and condensation reactions of the surface functionalization may be catalyzed by added hydrofluoric acid. The presence of fluoride ion in this and subsequent processing steps aids in the dehydroxylation of uncondensed silanols, replacing them with silicon-fluoride bonds.

After treatment with the coupling agents, the nanoparticles are then dispersed in the halogenated energy curable monomers or oligomers. As the surfaces of the nanoparticles are organophilic, they are highly soluble in the monomers or oligomers, and do not agglomerate significantly as indicated by light scattering measurements. As noted above, the condensed silica nanoparticles are generally available as a colloidal suspension in an organic solvent. At some point in the formulation process, the organic solvent may be removed by, for example, rotary evaporation. In the use of a methanolic colloidal suspension such as MA-ST-S, the methanolic solvent may be replaced before nanoparticle surface functionalization by evaporation of the methanol and addition of, for example, methyl ethyl ketone. In order to remove particulate matter which would cause scattering losses in the eventual polymer, it is desirable to filter the formulated energy curable composition through a filter of a porosity suitable to remove particulate matter while allowing the functionalized nanoparticles to pass through. For example, a 0.2 μm filter has been used in the Examples disclosed herein.

To enhance the rate of cure of the energy curable composition, a polymerization initiator may be added. The choice of the polymerization initiator will depend upon the identities of the curable moieties of the monomers or oligomers and the energy curable organosilane coupling agent. Any thermal initiator or photoinitiator known to polymerize the particular curable moieties of the energy curable composition may be used. The initiator may be present in an amount of from about 0.01% to about 10% by weight of the overall composition, and more suitably from about 0.1% to about 5%. The initiator is suitably chosen to be thermally inactive near room temperature (e.g. below about 50° C.). For example, if the curable moieties are, for example, epoxides or vinyl ethers, a cationic initiator, such as Sarcat® SR1010, a 50% solution of triarylsulfonium hexafluoroantimonate in propylene carbonate; Sarcat SR1011, a 50% solution of triarylsulfonium phosphate in propylene carbonate; or Sarcat SR1012, a diaryliodonium hexafluoroantimonate (all available from Sartomer, of Exton, Pa.), may be used. If the curable moieties are, for example, acrylates, methacrylates, maleimides, styrenes or alkenes, a free radical initiator, such as ESACURE® KTO46 (a blend of phosphine oxide, □-hydroxy ketone and a benzophenone derivative available from Sartomer, of Exton, Pa.); 2-hydroxy-2-methyl-1-phenylpropan-1-one; benzodimethyl ketal; 1-hydroxycyclohexyl phenyl ketone; benzoyl peroxide; and 1,1'-azobis(cyclohexanecarbonitrile). If the thiol-ene reaction, which is well-understood in the art, is to be used at least in part as the polymerization mechanism, both thiol moieties and ethylenically unsaturated moieties must exist in the composition, either in the energy curable coupling agent, the monomers or oligomers, or both. In the case of such thiol-ene systems, a free radical initiator may be used.

Other additives may also be added to the energy curable compositions depending on the purpose and the end use of the compositions. Examples of these include solvents, non-halogenated monomers or oligomers, antioxidants, photostabilizers, volume expanders, dyes, free radical scavengers, contrast enhancers, nitrones and UV absorbers known to those of skill in the art. Solvents, such as cyclohexanone, methyl ethyl ketone, and propylene glycol methyl ether acetate, and non-halogenated monomers or oligomers may be used to modify the properties of the energy curable composition and the polymer derived therefrom, as is appreciated by the skilled artisan. Antioxidants include such compounds as phenols and particularly hindered phenols including Irganox® 1010 from Ciba Additives of Tarrytown, N.Y.; sulfides; organoboron compounds; organophosphorous compounds; and N,N'-hexamethylenebis(3,5-di-tert-butyl-4-hydroxyhydrocinnamamide), available from Ciba Additives under the trade name Irganox 1098. Photostabilizers, and more particularly hindered amine light stabilizers, include but are not limited to poly[(6-morpholino-s-triazine-2,4-diyl)[(2,2,6,6, -tetramethyl-4-piperidyl)imino]-hexamethylene[(2,2,6,6, -tetramethyl-4-piperidyl)imino]] available from Cytec Industries of Wilmington, Del. under the tradename Cyasorb® UV-3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1- piperidinyloxy free radical (TEMPO), and the like. Suitable contrast enhancers include other free radical scavengers such as nitrones. UV absorbers include benzotriazole, hydroxybenzophenone, and the like. Each of these additives may be included in quantities up to about 6%, based upon the total weight of the composition, and usually from about 0.1% to about 1%.

The formulated energy curable composition thus includes silica nanoparticles which have been surface-functionalized with a mixture of the coupling agents, and thus are coated with an organic layer that is partially fluorinated and contains energy curable moieties. The energy curable composition also includes halogenated monomers or oligomers, and any excess organosilane coupling agents not consumed in the surface functionalization reaction. The silica nanoparticles are well-dispersed in the energy curable composition, exhibiting substantially no agglomeration. The composition may also include other species, such as polymerization initiators, additives, solvents, and non-halogenated monomers or oligomers.

The energy curable composition may be cured with an appropriate source of energy. For example, compositions formulated with a thermal initiator may be polymerized by the application of heat. Polymerization temperature depends on the thermal initiator used and usually ranges from about 60° C. to about 200° C., with temperatures between 70° C. and 100° C. being preferred. Thermal polymerization times may vary from several seconds to several hours, depending on the temperature and initiator used.

Compositions formulated with a photoinitiator may be polymerized by exposure to actinic radiation, defined as light in the visible, ultraviolet, or infrared regions of the spectrum, as well as electron beam, ion or neutron beam, or X-ray radiation. Actinic radiation may be in the form of incoherent light or coherent light, for example, from a laser. Sources of actinic light and exposure procedures, times, wavelengths and intensities may vary widely depending on the desired degree of polymerization, the index of refraction of the material, and other factors known to those of ordinary skill in the art. Such conventional photopolymerization processes and their operational parameters are well known in the art. Sources of actinic radiation and the wavelength of the radiation may vary widely, and any conventional wavelength and source can be used. It is preferable that the photoinitiator require that photochemical excitation be carried out with relatively short wavelength (high energy) radiation, so that exposure to radiation normally encountered before processing (e.g. room lights) will not prematurely polymerize the energy curable composition. Thus, exposure to ultraviolet light or deep ultraviolet light are useful. Convenient sources include high pressure xenon or mercury-xenon arc lamps filled with appropriate optical filters to select the desired wavelengths for processing. Short wavelength coherent radiation is useful for the practice of this invention. Thus, use of an argon ion laser operating in the UV mode at several wavelengths near 350 nm or a frequency-doubled argon ion laser with an output near 257 nm wavelength is highly desirable. Electron beam or ion beam excitation may also be used. Alternatively, the processing can utilize a multiphoton process initiated by a high intensity source of actinic radiation, such as a laser. Typical exposure times vary from a few tenths of seconds to about several minutes depending on the actinic source. Photopolymerization temperatures usually range from about 10° C. to about 60° C., with room temperature (18–27° C.) being preferred.

Figure 2:
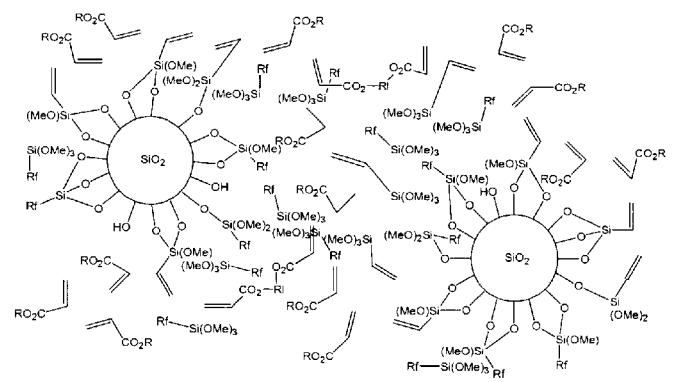
FIG. 2 is a diagram of the polymerization of an energy curable composition of the present invention to yield a hybrid material of the present invention.
Figure 2:
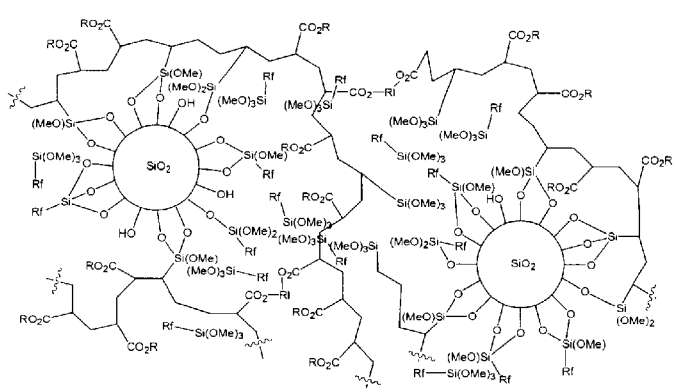
Figure 2:
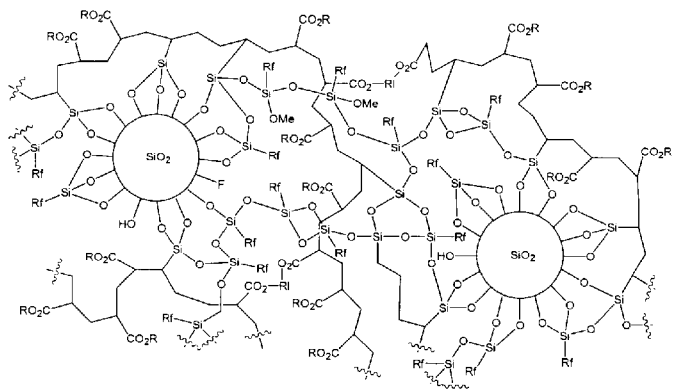

FIG. 2 is a diagram showing the polymerization of an exemplary energy curable composition on a molecular level. In FIG. 2, the fluorinated coupling agent is (1H,1H,2H,2H-tridecafluorooctyl)triethoxysilane, the energy curable coupling agent is vinyltrimethoxysilane, and the halogenated monomers are 1H,1H,2H,2H-heptadecafluorodecyl acrylate and 2,2,3,3,4,4,5,5-octafluorohexane-1,6-diyl diacrylate. Thus, in FIG. 2, Rf is 1H,1H,2H,2H-tridecafluorooctyl; R is 1H,1H,2H,2H-heptadecafluorooctyl; and R1 is 2,2,3,3,4,4,5,5-octafluorohexane-1,6-diyl. In the curing process, the energy curable moieties of the monomers, oligomers, the surface-functionalized nanoparticles, and the excess energy curable coupling agent polymerize to form a halogenated polymer matrix. The nanoparticles and the excess energy curable coupling agent thus become covalently bound to the polymer matrix. The silane portion of the excess energy curable coupling agent and the excess fluorinated coupling agent remain essentially unreacted and distributed throughout the halogenated polymer matrix. The material is then baked, preferably at a temperature between 120° C. and 250° C. During the baking, the silane portions of the excess energy curable coupling agent and of the excess fluorinated coupling agent condense with themselves, each other, and any unreacted silanols remaining on the nanoparticles to form a silicate network. An advantage of the process of the present invention is that dehydration and dehydroxylation during the baking step is facile due to the highly hydrophobic properties of the materials. Further, replacement of silanols with silicon-fluorine bonds in HF-containing materials increases the amount of dehydroxylation; such bonding can be confirmed with $^{29}$Si and $^{19}$F 2-dimensional NMR spectroscopy. As each silicon in the network is bound to an organic moiety as well as up to three other silicon atoms through Si—O—Si bonds, this type of network is known as an organically modified silicate, or "ormosil". The silicate network and the polymer network are covalently bound and substantially intermingled with each other, and are thus considered to be bicontinuous with one another.

The copolymerization of the energy curable moieties and the condensation of the coupling agents causes a high degree of interpenetration between the organic and the inorganic networks, providing for a highly homogeneous material. As a result of this interpenetration and the high inorganic content of the material, low shrinkage during curing was observed, and a low coefficient of thermal expansion and low thermo-optic coefficient are expected. Accordingly, dimension measurements on microreplicated patterns show that the inventive materials have volume shrinkages of less than about 5% upon UV curing, and less than an additional about 1% upon baking at temperatures of up to about 180° C., compared to the up to about 20% shrinkage observed upon cure for purely organic methacrylate or vinyl systems. Moreover, the process of the present invention reduces the capillary pressure effects and the shrinkage-induced stress that is experienced in the use of the sol-gel process. The polymeric materials of the present invention may be formed into articles of over about five microns, over about fifteen microns, over about 100 microns, and even over about 2 millimeters in thickness without exhibiting significant cracking. In contrast to the present invention, crack-free films of only up to about five microns in thickness may be made using the sol-gel process.

When cured in contact with a mold surface, the compositions of the present invention retain the shape of the mold, and thus are suitable for use in known polymer casting and molding processes. For example, the compositions of the present invention may be used in a UV embossing microreplication process. A detailed discussion of the UV embossing microreplication process may be found in commonly held and copending U.S. patent application Ser. No. 09/337,026, which is incorporated herein by reference. In this process, UV-curable liquid compositions are applied to a transparent substrate, then an embossing tool containing a surface relief pattern is applied to the liquid composition. The tool may be made, for example, from nickel by electroforming from a photoresist-on-silicon master. Generally, the tool is mounted on a cylindrical drum, and the drum rolled across the liquid composition. The UV-curable liquid is cured to a polymer with actinic radiation, such as ultraviolet radiation, by directing the radiation through the transparent substrate to cure the composition while in contact with the tool. The tool is then pulled (e.g. by rolling) away from the cured polymer leaving the inverse of the surface relief pattern of the tool in the cured polymer composition. In order to be suitable for this process, the composition must be UV curable and have a rate of cure sufficient to retain the fine structure of the embossing tool; must adhere to the substrate upon curing; and must release from (i.e. not adhere to) the tool after curing. Good release is necessary to ensure duplication of the smoothness and surface relief of the embossing tool.

The compositions of the present invention release better from embossing tools than standard curable compositions due to the low surface energy of the fluorinated material. Though they do not adhere to embossing tools, the compositions of the present invention do adhere well to glass substrates because the organosilane coupling agents of the formulation can make covalent bonds to silanol groups on the surface of the glass. The compositions of the present invention likewise have low volume shrinkage upon cure, allowing for precise transfer of the surface relief pattern of the tool to the cured polymer. The materials of the present invention are also suitable for use in other forming processes, such as standard photolithograpy/etching processes, and cast-and-cure.

Figure 3:
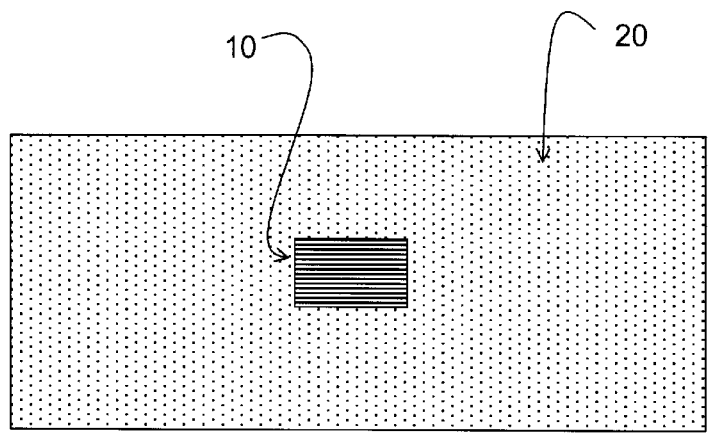
FIG. 3 is a side view of a waveguide of the present invention.
Figure 4:
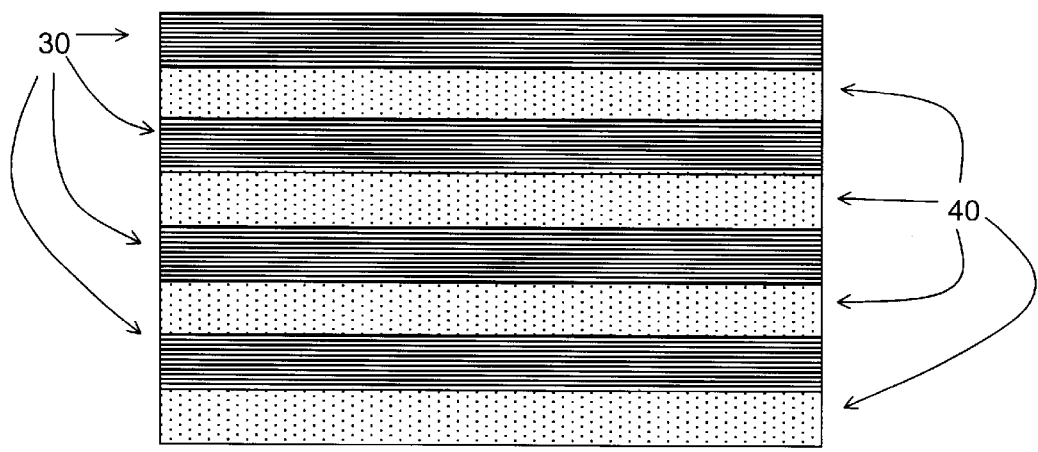
FIG. 4 is a side view of an interference filter of the present invention.

The compositions of the present invention have good processing characteristics and low optical loss, and are therefore suitable for use in the manufacture of optical elements for use in devices. For example, the UV embossing process detailed above may be used to create planar waveguides using the inventive compositions. An exemplary planar waveguide structure is shown in FIG. 3. The planar waveguide includes a waveguide core 10 and a waveguide cladding 20. At least one of the core and the cladding may be the polymeric material of the present invention. In another exemplary embodiment, the materials of the present invention may be used to create a thin film interference filter, as shown in FIG. 4. The exemplary filter of FIG. 4 includes layers 30 and 40 of two materials of differing refractive index; one of these materials may be in accordance with the invention disclosed herein. In a third exemplary embodiment, the compositions of the present invention may be cast into an appropriate mold to give a bulk optical element, such as, for example, a lens, a prism, or a window. The person of skill in the art will recognize that the present invention may be adapted for use in the construction of a wide variety of elements and devices.

The materials and processes of the present invention can best be understood by reference to the following examples, each of which illustrates an embodiment of the present invention. While each of these embodiments illustrate the present invention, they should not be construed in any way as limiting its scope.

EXAMPLE 1

In a 250 mL round-bottomed flask, 20.1 g of MEK-ST, 9.2 g of heptadecafluoro-1,1,2,2, -tetrahydrodecyltriethoxysilane and 10.0 g of 1H,1H,5H-octafluoropentyl acrylate were combined. The materials were magnetically stirred for 10 minutes at room temperature, yielding a cloudy mixture. The mixture was heated at reflux at 60° C. and 243 mbar for 1.5 hours, after which time the cloudiness was significantly reduced. Next, 12.37 g of (3-methacryloxypropyl) trimethoxysilane was added, and the mixture heated at reflux at 60° C. and 243 mbar for 1.5 hours, after which time the mixture was clear. The mixture was heated at 60° C. and 200 rbar for 2.5 hours and 60° C. and 126 mbar for 1.5 hours on a rotary evaporator to remove methyl ethyl ketone, yielding a viscous, slightly cloudy mixture.

Into 5.149 g of the above mixture was dissolved 3.330 g of UV-T, the tetraacrylate of Fluorolink T, a tetrafunctional hydroxide-terminated perfluoropolyether available from Ausimont. Synthesis of the tetraacrylate is described below and in commonly held and copending U.S. patent application Ser. No. 09/745,076, which is hereby incorporated by reference. The optical loss of this mixture was measured by measuring the absorbance of the liquid formulations for three different path lengths at 1300 nm and 1500 nm using a Perkin-Elmer Lambda 900 UV/Vis/NIR spectrophotometer. The slope of the absorbance vs. path length curve was converted to the units of dB/cm. The optical loss of the liquid was 0.12 dB/cm at 1300 run, and 0.45 dB/cm at 1550 nm. $^1$H, $^{13}$C, $^{13}$C-DEPT, HH-COSY and $^{29}$Si NMR spectroscopy of the energy curable composition confirmed that both the fluorinated organosilane and the energy curable organosilane were covalently bound to the silica nanoparticle surface.

Into 3.003 g of this mixture was dissolved 0.067 g of ESACURE® KT046 photoinitiator, yielding a clear solution. A sample of this mixture was drawn down to a thin film on a glass substrate using a 0.0005" Bird applicator. The drawn down film was UV cured under nitrogen by two passes at 20 mm/sec under a Fusion Systems F-450 300W/in$^2$ "D" lamp. The UV dose under these conditions was 5.55 J/cm$^2$ per pass as measured by a International Light IL-390B radiometer. The cured film was postbaked in a temperature programmable vacuum oven at a pressure of 100 mbar. The temperature program was as follows: heat from 30° C. to 150° C. at 30° C./hr; hold at 150° C. for 3 hours; cool from 150° C. to 25° C. at 31° C./hr. The refractive indices of the film were measured using a Metricon 2010 Prism Coupler instrument. The measured refractive indices were:

| Wavelength (nm) | n |
| --- | --- |
| 632 | 1.437 |
| 1300 | 1.425 |
| 1541 | 1.424 |

EXAMPLE 2

In a 500 mL round-bottomed flask, 20.05 g of MA-ST-S and 114.01 g of methyl ethyl ketone were combined. The mixture was concentrated by removing roughly 80 g of solvent by rotary evaporation at 20° C. and 80 mbar. After concentration, 120 g of methyl ethyl ketone was added and the mixture was stirred magnetically. While stirring, 20.04 g of MEK-ST was added dropwise. After complete addition of the MEK-ST nanoparticles, 6.71 g of 3-(pentafluorophenyl) propyltrimethoxysilane was added dropwise, followed by the dropwise addition of 8.0 g of 2,2,3,3,4,4-hexafluoro-1, 5-pentandiyl diacrylate. The mixture was stirred for 4.5 hours, after which time 12.50 g of 3-methacryloxypropyltrimethoxysilane was added dropwise. The mixture was allowed to stir at room temperature overnight, roughly 16 hours. The mixture was concentrated on a rotary evaporator, first at room temperature (roughly 20° C.) and 80 mbar for 40 minutes, then at 25° C. and 20 mbar for 20 minutes, and finally at 30° C. and 57 mbar for 20 minutes. The resulting 40.27 g of clear, colorless liquid was filtered through at 2.7 µm Whatman GF/D syringe filter.

To 8.2 g of the clear, colorless liquid was added 0.20 g ESACURE® KTO 46 photoinitiator. The mixture was filtered through a 0.45 µm PVDF syringe filter. The filtered mixture was drawn down to a film on a glass substrate using a 0.0005" Bird applicator. The film was cured with three passes in the UV curing belt of Example 1. Each pass was measured to be 9.1 J/cm$^2$ in dosage. Cured samples were postbaked at 150° C. for 1 hour.

The optical loss of the cured film was 0.30 dB/cm at 1300 nm. The refractive index was as follows:

| Wavelength (nm) | n |
|---|---|
| 632 | 1.437 |
| 1300 | 1.425 |
| 1541 | 1.424 |

The processability of this material was evaluated in a microreplication process using a nickel tool with ribs having a height of 8.1 µm and a width of 10.1 µm. The material released well from the nickel tool. The surfaces of the embossed patterns were extremely flat, with a surface roughness of 10–20 nm. The material displayed low volume shrinkage during curing and during subsequent baking. The dimension changes of the embossed pattern are listed below. The material of the present invention demonstrates significantly low dimensional changes compared to normal acrylate materials, which can shrink up on curing by up to 20%.

solution of 0.938 g of 48% hydrofluoric acid in 50.0 g of methyl ethyl ketone was added. While stirring, 6.529 g of 3-(pentafluorophenyl)propyltrimethoxysilane was added dropwise, followed by 4.203 g of 2,2,3,3,4,4-hexafluropentane-1,5-diyl diacrylate. The mixture was stirred overnight, roughly 16 hours. The mixture was concentrated by rotary evaporation, first at room temperature and 180 mbar for 1 hour, then at room temperature and 36 mbar for one hour. The mixture was passed through a 0.2 □m filter, yielding a slightly hazy product, which was then mixed with photoinitiator, drawn down, cured and postbaked to a hard film as described in connection with Examples 1 and 2. As noted above, the hydrofluoric acid served as a catalyst for hydrolysis and polycondensation, and also as a dehydroxylation agent.

$^{29}$Si and $^{19}$F 2-dimensional NMR spectroscopy showed that silicon-fluoride bonds formed, replacing uncondensed alkoxysilanes and silanols on the surface of the sol and in the organically modified silicate matrix. The presence of fluoride ion in the solution was significantly helpful in dehydroxylation, as evidenced by infrared spectroscopic monitoring of the hydroxyl absorption peak during postbake in materials formulated with and without hydrofluoric acid.

EXAMPLE 4

In a 500 mL round-bottomed flask, 20.29 g of MA-ST-S and 100.0 g of methyl ethyl ketone were combined. The mixture was concentrated by removing roughly 30 g of solvent by rotary evaporation at 20° C. and 80 mbar for 20 min. After concentration, 100.0 g of methyl ethyl ketone was added and the mixture was stirred magnetically. While stirring, 21.16 g of MEK-ST was added dropwise, giving a slightly hazy mixture. After complete addition of the nanoparticle suspension, 6.70 g of [3-(pentafluorophenyl)propyl]trimethoxysilane was added dropwise, followed by the dropwise addition of 11.94 g hexafluoroisopropyl methacrylate and 8.0 g of 2,2,3,3,4,4-hexafluoro-1,5-pentandiyl diacrylate. The mixture was stirred for 12 hours, after which time 12.5 g of (3-methacryloxypropyl)trimethoxysilane was Dimensional Changes during UV Cure and Post-Baking

| | Nickel Tooling | UV cure Only | Post-Bake for 4 hrs. @ 120° C. | Post-Bake for 4 hrs. @ 150° C. | Post-Bake for 4 hrs. @ 180° C. | Post-Bake for 4 hrs. @ 200° C. | Post-Bake for 4 hrs. @ 250° C. |
|---|---|---|---|---|---|---|---|
| Step Height (µm) | 8.1 | 7.8 | 7.8 | 7.7 | 7.8 | 7.7 | 7.5 |
| Change (%) | | 3.7 | 0.0 | 1.3 | 0.0 | 1.3 | 2.6 |
| Width (µm) | 10.1 | 10.1 | 10.1 | 10.1 | 10.1 | 9.1 | 9.1 |
| Change (%) | | 0.0 | 0.0 | 0.0 | 0.0 | 9.9 | 9.9 |

An advantage of such low shrinkage is that a very fine pattern can be microreplicated without loss of resolution. Another advantage is that the UV-cure caused only Z-direction shrinkage, which can be accounted for by adjusting the dimensions of the microreplication tool. Post-baking caused almost no shrinkage in the X, Y, and Z dimensions until the post-baking temperature reached 200° C. The patterns were baked in air without damage, and thus exhibit good thermal stability.

EXAMPLE 3

In a 250 mL round-bottomed flask, 9.947 g of MEK-ST and 2.964 g of MA-ST-S were combined. The mixture was magnetically stirred for 5 minutes, after which time a added dropwise. The mixture was stirred at room temperature for 4 hours. The mixture was then concentrated on a rotary evaporator, first at room temperature (roughly 20° C.) and 80 mbar for 40 minutes, then at 30–33° C. and 115 mbar for 40 minutes, yielding 33.47 g of colorless liquid. This mixture was then filtered, mixed with photoinitiator, drawn down, cured and postbaked to a hard film as described in connection with Examples 1 and 2.

EXAMPLE 5

A glass three-neck flask was fitted with a condenser and stirrer. Fluorolink T brand fluorinated polyol (900 g) and p-methoxyphenol (0.5 g) were added to the flask. The fluorinated polyol used in this example can be described as having the structure:

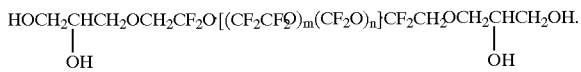

where the ratio of m:n varies from about 0.5:1 to 1.4:1, m varies from about 6.45 to about 18.34 on average, and n varies from about 5.94 to about 13.93 on average. Desirable materials have a ratio of m:n of about 1, and an average m and an average n of about 10.3.

Acryloyl chloride (170 g) was added, and the mixture was vigorously stirred. The resulting exotherm brought the temperature up to 70° C. The temperature of the reaction mixture was then raised to 90° C. and the mixture was stirred for three hours. The system was then placed under vacuum to remove the hydrogen chloride generated by the reaction and the excess acryloyl chloride. The mixture was cooled to room temperature. An infrared spectrum of the material confirmed the disappearance of the broad absorbance at 3500 cm$^{-1}$, which is attributed to hydroxyl groups on the polyol. Triethylamine (124 g) was slowly added to the reaction flask over a ½ hour period. The material was filtered remove the triethylamine hydrochloride which formed, then washed twice with water. The resulting tetraacrylate has been named UV-T and can be described as having the structure

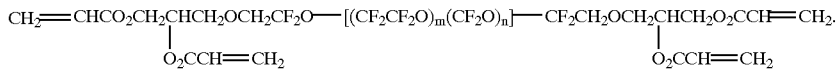

where the ratio of m:n varies from about 0.5:1 to 1.4: 1, m varies from about 6.45 to about 18.34 on average, and n varies from about 5.94 to about 13.93 on average. Desirable materials have a ratio of m:n of about 1, and an average m and an average n of about 10.3. These perfluoropolyether tetraacrylates have low refractive index and can be useful in adjusting the crosslinking density of the cured polymer to vary its physical properties. High molecular weight versions of this material can be very low in loss. One example of a perfluoropolyether tetraacrylate has a molecular weight of 2400 g/mol, a liquid refractive index of 1.3362, a cured homopolymer refractive index of 1.335, and a liquid density of 1.663 g/mL.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

I claim:
1. A device comprising an optical element including a polymeric material including:
condensed silica nanoparticles having a mixture of organosilane coupling agents covalently bound to the exterior surface of the nanoparticles; and
a halogenated solid polymer matrix,
wherein the mixture of organosilane coupling agents includes an at least partially fluorinated coupling agent, and a coupling agent covalently bound to the polymer matrix; and
the condensed silica nanoparticles are homogeneously dispersed in the solid polymer matrix.

2. The device of claim 1 wherein the optical element is a planar optical device comprising a waveguide core and a waveguide cladding, wherein at least one of the waveguide core and waveguide cladding is a polymeric material including:
condensed silica nanoparticles having a mixture of organosilane coupling agents covalently bound to the exterior surface of the nanoparticles; and
a halogenated solid polymer matrix,
wherein the mixture of organosilane coupling agents includes an at least partially fluorinated coupling agent, and a coupling agent covalently bound to the polymer matrix; and
the condensed silica nanoparticles are homogeneously dispersed in the solid polymer matrix.

3. The device of claim 1 wherein the optical element is a thin film optical fiber including alternating layers of two or more transparent materials with differing refractive indices, wherein at least one of the transparent materials is a polymeric material comprising:
condensed silica nanoparticles having a mixture of organosilane coupling agents covalently bound to the exterior surface of the nanoparticles; and
a halogenated solid polymer matrix,
wherein the mixture of organosilane coupling agents includes an at least partially fluorinated coupling agent, and a coupling agent covalently bound to the polymer matrix; and
the condensed silica nanoparticles are homogeneously dispersed in the solid polymer matrix.

4. The device of claim 1 wherein the optical element is a bulk optical element made from a polymeric material comprising:
condensed silica nanoparticles having a mixture of organosilane coupling agents covalently bound to the exterior surface of the nanoparticles; and
a halogenated solid polymer matrix,
wherein the mixture of organosilane coupling agents includes an at least partially fluorinated coupling agent, and a couplulg agent covalently bound to the polymer matrix; and
the condensed silica nanoparticles are homogeneously dispersed in the solid polymer matrix.

5. The optical device of claim 1, wherein the polymeric material is formed by curing an energy curable composition comprising
condensed silica nanoparticles;
an at least partially fluorinated organosilane coupling agent;
an energy curable organosilane coupling agent including an energy curable organic moiety; and
a halogenated energy curable monomer or oligomer.

6. The optical device of claim 5 wherein:
the at least one partially fluorinated organosilane coupling agent has the formula

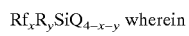

Rf is an at least partially fluorinated organic moiety bound to the silicon atom by a carbon atom, R is an organic moiety bound to the silicon atom by a carbon atom, Q is a hydrolyzable ligand selected from the group consisting of chlorine, bromine, iodine, a $C_1$ to about $C_{10}$ alkoxy, and a $C_1$ to about $C_{10}$ acyloxy, x is 1, 2, or 3, y is 0, 1, or 2, and the sum of x and y is no greater than 3; and the at least once energy curable organosilane coupling agent including an energy curable organic moiety has the formula $Rd_xR_ySiQ_{4-x-y}$ wherein Rd is an organic moiety including an energy curable functional group bound to the silicon atom by a carbon atom, R is an organic moiety bound to the silicon atom by a carbon atom, Q is a hydrolyzable ligand selected from the group consisting of chlorine, bromine, iodine, a $C_1$ to about $C_{10}$ alkoxy, and a $C_1$ to about $C_{10}$ acyloxy, x is 1, 2, or 3, y is 0, 1, or 2, and the sum of x and y is no greater than 3.

7. The optical device of claim 5 wherein the at least partially fluorinated organosilane coupling agent includes a perfluorinated alkane moiety.

8. The optical device of claim 5 wherein the at least partially fluorinated organosilane coupling agent includes a perfluorinated aryl moiety.

9. The optical device of claim 8 wherein the at least partially fluorinated organosilane coupling agent is [3-(pentafluorophenyl)propyl]-trimethoxysilane.

10. The optical device of claim 5 wherein the energy curable organosilane coupling agent includes an energy curable organic moiety which is ethylenically unsaturated.

11. The optical device of claim 10 wherein the energy curable organosilane coupling agent is 3-(methacryloxypropyl)trimethoxysilane.

12. The optical device of claim 5 wherein the energy curable organosilane coupling agent includes an energy curable moiety selected from the group consisting of epoxide and thiol.

13. The optical device of claim 5 wherein the halogenated energy curable monomer or oligomer is a fluorinated monomer selected from the group consisting of fluorinated acrylates, fluorinated methacrylates, fluorinated alkenes, fluorinated malcimides, fluorinated styrenes, fluorinated epoxides, fluorinated vinyl ethers and fluorinated thiols.

14. The optical device of claim 13 wherein the halogenated energy curable monomer or oligomer is 2,2,3,3,4,4-hexafluropentane-1,5-diyl diacrylate.

15. The optical device of claim 5 wherein the halogenated energy curable monomer or oligomer is a chlorinated monomer selected from the group consisting of chlorinated acrylates, chlorinated methacrylates, chlorinated styrenes, chlorinated vinyl ethers, chlorinated alkenes, chlorinated malcimides and chlorinated thiols.

16. The optical device of claim 5 wherein the halogenated energy curable monomer or oligomer is an oligomer selected from the group consisting of perfluoropolyether polyacrylates, halogenated polyester polyacrylates, halogenated polyester polymethacrylates, halogenated polycarbonate polyacrylates, and halogenated polycarbonate polymethacrylates.

17. The optical device of claim 5 wherein the halogenated energy curable monomer or oligomer is a capped perfluoropolyether of the formula $(A)_n$—R—Rp—R'—$(A)_n$ wherein Rp is a perfluorinated polyether moiety selected from the group consisting of —$CF_2O$—$(CF_2CF_2O)_m(CF_2O)_n$—$CF_2$—, —$CF(CF_3)O(CF_2)_4O[CF(CF_3)CF_2O]_qCF(CF_3)$—, and —$CF_2O$—$(CF_2CF_2O)_m(CF_2O)_n$—$CF_2$—;

m and n designate the number of randomly distributed perfluoroethyleneoxy and perfluoromethyleneoxy backbone repeating subunits respectively, and q designates the number of —$CF(CF_3)CF_2O$— backbone repeating subunits;

R and R' are divalent or trivalent connecting moieties selected individually from the group consisting of alkyl, aryl, ester, ether, amide, amine, and urethane groups; and A is a energy curable moiety selected from the group consisting of acrytate, methacrylate, maleimide, alkene, vinyl ether, epoxide, and thiol.

18. The optical device of claim 5 further comprising hydrofluoric acid.

19. The optical device of claim 5 wherein substantially all the condensed silica nanoparticles are less than about 75 nm in diameter.

20. The optical device of claim 5 wherein the condensed silica nanoparticles are in the range of about 1 to about 50 nm in diameter.

21. The optical device of claim 5 wherein the condensed silica nanoparticles are in the range of about 5 to about 25 nm in diameter.

22. The optical device of claim 1, wherein the polymeric material comprises:

condensed silica nanoparticles having a mixture of organosilane coupling agents covalently bound to the exterior surface of the nanoparticles; and a halogenated solid polymer matrix, wherein the mixture of organosilane coupling agents includes an at least partially fluorinated coupling agent, and a coupling agent covalently bound to the polymer matrix; and the condensed silica nanoparticles are homogeneously dispersed in the solid polymer matrix.

23. The optical device of claim 22 wherein substantially all the condensed silica nanoparticles are less than about 75 nm in diameter.

24. The optical device of claim 22 wherein the condensed silica nanoparticles are in the range of about 5 to about 50 nm in diameter.

25. The optical device of claim 22 further comprising an at least partially fluorinated organically modified silicate network bicontinuous with the polymer matrix and covatently bound to the polymer matrix through an organosilane coupling agent.

26. The optical device of claim 22 wherein the halogenated solid polymer matrix is a copolymer of 2,2,3,3,4,4-hexafluoropentane-1,5-diyl diacrylate.

27. The optical device of claim 22 wherein the mixture of coupling agents includes a 3-(methacryloxypropyl)silanc species and a 3-(pentafluorophenyl)propylsilane species.

* * * * *